United States Patent
Altmayer et al.

(10) Patent No.: US 11,933,360 B2
(45) Date of Patent: Mar. 19, 2024

(54) SEAL FOR LARGE ROLLER BEARING

(71) Applicant: Liebherr-Components Biberach GmbH, Biberach an der Riss (DE)

(72) Inventors: Thomas Altmayer, Gutenzell-Hürbel (DE); Andreas Palmer, Riedlingen (DE)

(73) Assignee: Liebherr-Components Biberach GmbH, Biberach an der Riss (DE)

(*) Notice: Subject to any disclaimer, the term of this patent is extended or adjusted under 35 U.S.C. 154(b) by 113 days.

(21) Appl. No.: 17/448,029

(22) Filed: Sep. 17, 2021

(65) Prior Publication Data
US 2022/0003276 A1 Jan. 6, 2022

Related U.S. Application Data

(63) Continuation of application No. PCT/EP2020/057195, filed on Mar. 17, 2020.

(30) Foreign Application Priority Data

Mar. 21, 2019 (DE) ...................... 20 2019 101 636.1

(51) Int. Cl.
*F16C 33/76* (2006.01)
*F16C 19/08* (2006.01)
*F16C 33/60* (2006.01)

(52) U.S. Cl.
CPC ............ *F16C 33/768* (2013.01); *F16C 19/08* (2013.01); *F16C 33/60* (2013.01)

(58) Field of Classification Search
CPC .... F16C 33/60; F16C 33/768; F16C 2360/31; F16C 2300/14; F16L 17/035; F16L 27/0824; F16J 15/52
See application file for complete search history.

(56) References Cited

U.S. PATENT DOCUMENTS 5,641,239 A * 6/1997 Michalek ................ F16C 33/60
403/387
7,121,728 B2 * 10/2006 Pete ........................ F16C 33/60
384/477
(Continued)

FOREIGN PATENT DOCUMENTS

AU 3449668 5/1970
CN 103201528 7/2013
(Continued)

OTHER PUBLICATIONS

Li Zhengbo, "Oil Film Bearing of Rolling Mill Analysis and Countermeasures of DF Seals and Water Seals and Their Common Damage Forms", Lubrication Engineering, Issue 6, pp. 101-102, 105 Nov. 30, 2003.
(Continued)

*Primary Examiner* — Alan B Waits
(74) *Attorney, Agent, or Firm* — Levine Bagade Han LLP

(57) ABSTRACT

The invention relates to a seal for a large roller bearing for sealing a joint between two adjacent ring segments or ring parts of the roller bearing, wherein at least two mutually spaced apart sealing limbs of a rubber elastic and/or yielding sealing material for sealing insertion into grooves that are formed at both sides of the joint in ring segments or ring parts that are adjacent to one another and a connection section connecting the sealing limbs and composed of a rubber elastic and/or yielding sealing material to span said joint.

18 Claims, 2 Drawing Sheets

(56) References Cited

U.S. PATENT DOCUMENTS

| | | | | |
|---|---|---|---|---|
| 2009/0123099 | A1* | 5/2009 | Dickerhoff | F16C 35/063 |
| | | | | 384/459 |
| 2014/0191508 | A1 | 7/2014 | Schroppel et al. | |
| 2017/0082146 | A1 | 3/2017 | Happ et al. | |
| 2019/0024711 | A1 | 1/2019 | Takarabe et al. | |
| 2019/0264747 | A1* | 8/2019 | Tanke | F16C 33/768 |

FOREIGN PATENT DOCUMENTS

| | | |
|---|---|---|
| CN | 206299700 U | 7/2017 |
| DE | 4222852 | 1/1994 |
| DE | 10125253 | 12/2001 |
| DE | 102005016709 | 10/2006 |
| DE | 202010014830 U1 | 4/2011 |
| DE | 102010018255 | 10/2011 |
| DE | 102014116747 | 5/2016 |
| DE | 102015220151 | 4/2017 |
| DE | 102016218134 | 3/2018 |
| EP | 0413119 | 2/1991 |
| EP | 2092204 | 8/2012 |
| GB | 537606 | 6/1941 |
| JP | 2003-004055 | 1/2003 |
| JP | 2014-005897 | 1/2014 |
| WO | WO 2008/088213 | 7/2008 |
| WO | WO 2012/069274 | 5/2012 |
| WO | WO 2018/173731 | 9/2018 |
| WO | WO 2020/187874 | 9/2020 |

OTHER PUBLICATIONS

Wu Xianming et al., "Improvement on the Sealed and Driving Structure of Water-pressure Radial Plunger Piston Pump", Machine Tool & Hydraulics, vol. 39, No. 2, pp. 74-76, Jan. 28, 2011.

Yang Qi-ming et al., "High Speed Journal Seal Of Cone Bit Design and Finite Element Method Analyze", Journal of Southwest Petroleum University, vol. 25, No. 6, pp. 63-65, Dec. 30, 2003.

Zhang Pengju et al., "Research on the Design of Non Metal Annular Seal on Subsea Tubing Hanger", Equipment Manufacturing Technology, No. 11, pp. 44-47, Nov. 15, 2014.

* cited by examiner

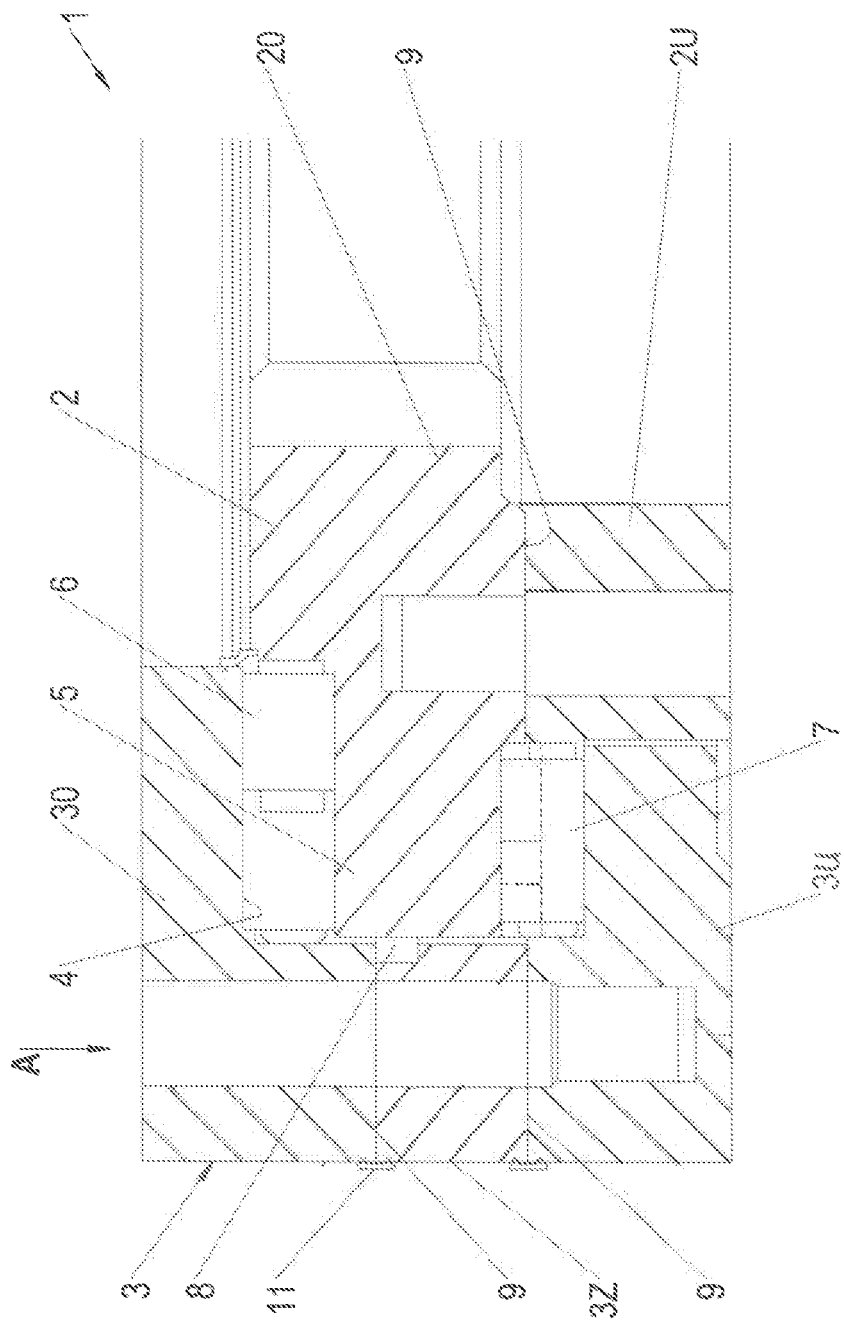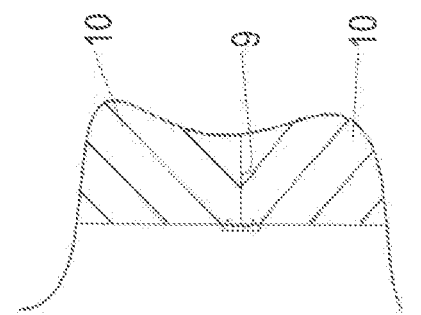

SEAL FOR LARGE ROLLER BEARING

CROSS-REFERENCE TO RELATED APPLICATIONS

This application is a continuation of International Patent Application Number PCT/EP2020/057195 filed Mar. 17, 2020, which claims priority to German Patent Application Number DE 20 2019 101 636.1 filed Mar. 21, 2019, both of which are incorporated herein by reference in their entireties.

BACKGROUND

The present invention generally relates to roller bearings in which joints between ring segments have to be sealed. In this respect, the invention in particular relates to open centered large roller bearings having two bearing rings that can be rotated with respect to one another, wherein at least one of the bearing rings comprises a plurality of ring segments or ring parts that are adjacent to one another at a joint, with a seal being provided to seal the joint. The invention in this respect in particular also relates to the seal itself.

With large rolling bearings for special applications, considerable bending moments and tilting forces sometimes act on the bearing rings which can lead to twisting and to an angular offset of the ball races with respect to one another such that premature wear occurs in the region of the ball races and of the rolling elements. Such large rolling bearings can have dimensions of a plurality of meters in diameter and can, for example, be used on cranes in order, for example, to rotatably support and to prop up the support mast of a ship crane or of a harbor crane, with here not only vertical forces having to be absorbed, but also bending moments or tilt loads. The twisting and tilting problems are in this respect further aggravated when the middle or center of the bearing has to be kept free to allow the component to be supported, for example said crane support mast, to pass through the bearing or to be able to attach a rotary drive to the part which has to be passed through. The bearing rings of such a center-free large roller bearing can in particular not be of any desired size in construction in the radial direction for space reasons so that the achievable moments of inertia of an area of the ball races are limited.

A large roller bearing of the initially named kind is shown, for example, in the document EP 2 092 204 B1, in accordance with which the scraper ring of the one ball race is to be clamped by two oppositely disposed axial bearings and two oppositely disposed radial bearings in the groove of the other ball race, wherein said oppositely disposed axial bearings and radial bearings should prevent unwanted deformation of the scraper ring and should avoid a peeling of the ball races in the radial direction. A similar large roller bearing and its installation situation at the support mast of a ship crane is shown by the document WO 2008/088 213 A2. Whereas the named documents essentially deal with the problems of the separation of the radial bearings as a consequence of twisting of the ball races and want to avoid such a lifting of the radial bearings by the clamping of the scraper ring by oppositely disposed jacket surface sides, twisting still occurs in the region of the axial bearings that make a sealing of the bearing difficult.

Due to their size, such large roller bearings are frequently produced in a segmented manner of construction, with the inner ring and/or the outer ring each being able to be composed of a plurality of ring segments or ring parts so that joints are produced between the ring segments or ring parts. In this respect, both axial joints can result, when a ring or a ring part of ring segments that are of the shape of a circle arc and that each form a ring sector are arranged after one another in a peripheral direction, and radial joints can be present, when a plurality of ring parts are so-to-say stacked over one another or are placed next to one another in a different manner, for example when a holding ring is screwed together with or is connected in another manner to the actual bearing ring. Depending on the division of the bearing rings, horizontal or vertical joints and/or joints extending in the peripheral direction can be present in combination with one another.

Said joints here form a potential leak point via which moisture can penetrate into the bearing and can damage the raceways and the rolling elements. In particular when the roller bearing is used in a maritime environment and is exposed to saltwater spray, corrosion of the raceway and a failure of the bearing can result as a consequence of the load from spray water and splash water. To prevent this, said joints or gaps between adjacent ring segments have to be sealed as much as possible against penetrating water and moisture.

It is known from document U.S. Pat. No. 5,641,239 B to connect ring parts of a roller bearing ring together and to hold them at one another by a U-shaped connection clip. The limbs of the connection clip that project in U shape in this process wedge into grooves that are introduced into the ring parts. Such wedging connection clips are, however, hardly suitable to control the twists of the ring segments or of the ring parts and to take up the forces that occur in so doing with open centered large roller bearings. The connection clips have to consist of a high-strength material to be able to actually hold the ring parts together so that the required flexibility and sealing effect is lacking. A lifting of the connection clip that has to hold the ring segments together and to apply the holding forces occurs on deformations and relative movements of the ring segments in the region of the joints so that microgaps form between the surfaces of the clip body and the groove surfaces into which moisture can trickle. To this extent, such U-shaped connection clips that have to hold the ring parts together and that have to apply the retention forces do not provide any sufficient seal of the joint between the ring segments.

To achieve such a seal, it is known to grout the joints with a deformable and/or elastic sealing compound, with such sealing compounds being able to be formed, for example, on a silicone basis. The joints can be coated with the sealing compound before the joining so that the sealing compound is then pressed in the gap on assembly.

Due to the huge strains on the bearing rings, they can deform and twist, as initially explained, which not only strains the rolling elements, but also said sealing of the joints. To maintain a sealing effect despite deformations of the bearing rings or bearing segments, the seal nevertheless has to be formed as flexible to also remain functional on larger deformations of the bearing. Sealing compounds used to date, however, lose their elasticity originally present per se due to aging and environmental influences. The seal can age and become cracked so that it can also already leak on smaller deformations of the bearing rings in the region of the joints.

SUMMARY

Starting from this, it is the underlying object of the present invention to provide an improved roller bearing and an improved seal for such a roller rearing that avoid the disadvantages of the prior art, and further develop the latter in an advantageous manner. A reliable seal of the joints of the bearing rings should in particular also be achieved even when the bearing rings deform under operating loads.

Said object is achieved in accordance with the invention by a seal for a roller bearing in accordance with claim 1 and by a roller bearing have such a seal in accordance with 10. Preferred embodiments of the invention are the subject of the dependent claims.

It is therefore proposed to use a seal that spans the joint and is anchored in the respective ring parts at both sides of the joint. The seal is seated at both sides of the joint to be sealed in holding recesses in the respective ring part so that the seal section spanning the joint is held in position and can deform elastically even when the joint expands due to deformations. In accordance with the invention, the seal has at least two sealing limbs of a rubber elastic and/or yielding sealing material that are spaced apart from one another and that are sealingly seated in grooves that are formed at both sides of the joint in the two adjacent ring segments or ring parts and furthermore has a connection sealing section of a rubber elastic and/or yielding sealing material that connects the two sealing limbs and that spans said joint. The rubber elastic and/or yielding sealing limbs also sealingly nestle at the walls of the grooves worked into the ring parts on deformations and relative movements of the ring parts in order not to let any moisture penetrate via microgaps or the like. Due to the rubber elastic and/or yielding formation of the connection section, the connection section can deform and yield on deformations or relative movements of the ring parts without having to apply holding forces that would impair the sealing effect.

Said sealing limbs can here be held in the respective groove by a press fit or in a clamping manner, with said sealing limbs being able to be pressed or seated in said groove under elastic deformation. The connection section of the seal is safely held in position by the sealing limbs seated in the groove and spans the joint that is hereby sealed. If the grooves in the different ring segments or ring parts move relative to one another as a result of deformations of the bearing ring, said connection section between the sealing limbs seated in the groove can elastically deform to compensate said deformation movements.

The connection section between the sealing limbs sealingly seated in the grooves is here dimensioned and/or configured such that no real resistance is set against a deformation and/or relative movements of the ring parts adjacent to the joints. The connection section does not apply any holding forces that would attempt to hold the ring parts at one another, but rather only serves the sealing of the joint and also seals the latter when the joint should expand under deformations of the adjacent ring parts. The connection section takes part in such deformations and relative movements of the ring parts and compensates them without applying counteracting holding forces that could impair the sealing effect of the sealing limbs in the grooves.

Said seal can here be provided in addition to other sealing measures at said joint, for example in addition to a sealing of the joint by a sealing compound that grouts the joint and that can be spread between the joints in the manner of an adhesive. Said seal can, however, also form the only sealing measure at the joint.

The seal can advantageously consist of an elastic plastic or rubber material, for example EPDM (ethylene propylene diene monomer rubber) or NBR (acrylonitrile butadiene rubber).

The seal, including said sealing limbs and the connection section disposed therebetween, can here consist homogeneously of the same material overall. It is, however, also alternatively possible to produce different sections of the seal from different materials, for example by multicomponent injection molding. In this process, for example, different plastic materials or rubber materials of different hardness or elasticity can be used to provide different stretching properties and/or elasticity properties to different sealing sections. Alternatively or additionally, hard material sections can also be connected to soft plastic sections; for example, a hard material reinforcement can be cast in plastic to satisfy increased strength demands.

In a further development of the invention, the connection section between the two sealing limbs that is seated in the grooves and that spans the joint can comprise a desired stretching section that has an increased elasticity and/or increased yield in comparison with adjacent sections of the seal. Deformations of the bearing rings or of the ring segments can be easily taken up by such a desired stretching section of reduced stretching and/or bending stiffness without the seal tearing or the sealing limbs being drawn out of the grooves.

Said desired stretching section between the sealing limbs seated in the grooves can, for example, have a reduced wall thickness that is reduced in comparison with adjacent sealing sections and/or in comparison with the sealing limbs seated in the grooves. The reduced wall thickness can, for example, amount to less than 80%, or less than 60%, or less than 40%, of the wall thickness of the adjacent sealing sections and/or of said sealing limbs.

Alternatively or additionally, said desired stretching section can have a desired stretching fold that is contoured in a bead-like or wave-like manner and that can form a channel-like or wall-like arch in the unstretched state that so-to-say keeps additional material available and is drawn flat on a moving apart of the two sealing limbs seated in the grooves.

In a further development of the invention, a plurality of such desired stretching folds can also be arranged next to one another so that the connection section between the two sealing limbs seated in the grooves is arched in a manner meandering to and fro in the manner of a corrugated sheet or in the manner of corrugated cardboard.

Said sealing limbs that are seated in the grooves at both sides of the joint can each advantageously have at least one laterally projecting, web-like sealing lip that, on the seating of the respective sealing limb, deforms in the associated groove and lies elastically at the wall of the groove.

Said sealing limbs can overall have a slight oversize with respect to the groove, with said oversize being able to be present at least when taking account of the laterally projecting sealing lips, but also by the web body alone, that is without the laterally projecting sealing lips.

The seal can be configured in the manner of an extruded section as an elongate sectional body overall that can have a substantially unchanging cross-section over its longitudinal axis. The seal sectional body can have a straight longitudinal axis, but optionally also an arcuately curved longitudinal axis depending on the joint to be sealed.

Viewed in cross-section, the two sealing limbs that are spaced apart from one another and that should be seated in the grooves and the interposed connection section can form a U-shaped cross-sectional profile, with the two sealing limbs being aligned in parallel with one another, but can optionally also be set in a slightly V-shaped manner or in a roof-like manner or generally in a slightly acutely angled manner to one another.

BRIEF DESCRIPTION OF THE DRAWINGS

The invention will be explained in more detail in the following with reference to a preferred embodiment and to associated drawings. There are shown in the drawings:

FIG. 1: a half-section view of an open centered large roller bearing whose bearing rings are composed of a plurality of ring segments in a segment construction, with the joints of the ring segments each being sealed by a seal and with two seals being visible at the outer periphery of radial joints in FIG. 1;

FIG. 2: a plan view of the outer ring of the bearing of FIG. 1 along the direction of view A that is entered there and that shows a vertical joint extending in the axial direction between two ring segments and a seal associated with this vertical joint.

DETAILED DESCRIPTION

Figure 3:
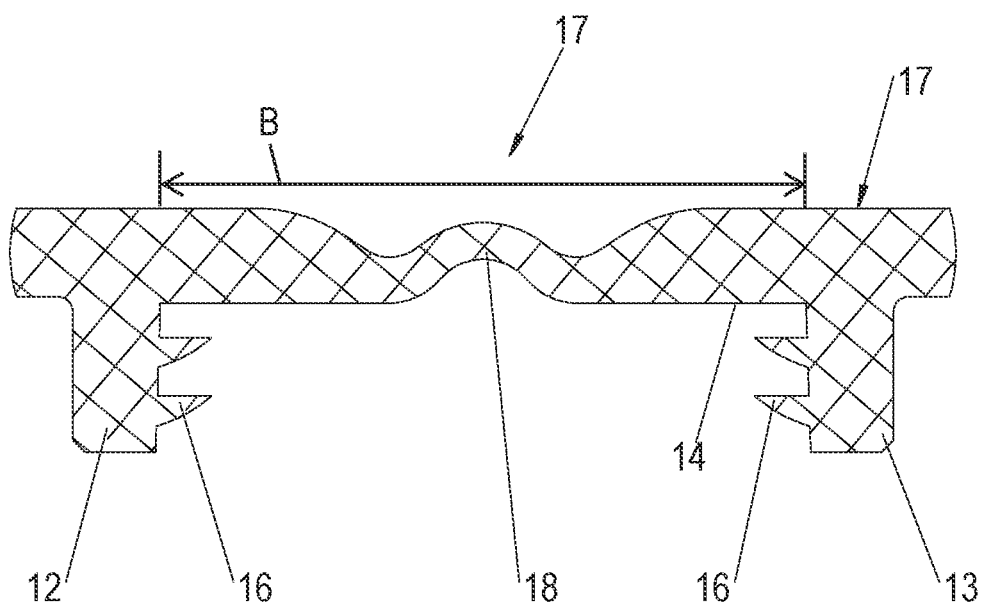
FIG. 3: a sectional view of one of the seals of FIGS. 1 and 2 that shows the two sealing limbs seated in grooves and the interposed connection sections of the seal.

As FIG. 1 shows, the large rolling bearing 1 can comprise two ball races 2 and 3 of which the one ball race 2 forms an inner ring and the other ball race 3 forms an outer ring. Said inner ring 2 can have a smaller inner diameter than the outer ring 3 and/or the outer ring 3 can have a larger outer diameter than said inner ring 2.

The one ball race 3, for example the inner ring, can have an open groove 4 to the other ball race 2, for example to the inner ring, in which groove 4 the other ball race 2 engages with a scraper ring 5 provided thereat while forming a gap or with a spacing at all sides.

As FIG. 1 shows, a plurality of rolling element rows can be provided between the two ball races 3 and 3 and can comprise one or more axial bearing rows 5, 6, and 7 and one or more radial bearing rows 8. Said rolling element bearing rows can in particular be arranged in the region between the scraper ring 5 and the groove 4 to support the two ball races 2 and 3 at one another, but can optionally also be positioned differently than shown in the drawing.

To be able to insert the scraper ring 5 into said groove 4, the ball race 3 having the groove 4 can be composed of a plurality of ring parts or can comprise a plurality of rings. As FIG. 1 shows, said ball race 3 can, for example, have two separating planes in the region of the groove 4 that can extend perpendicular to the direction of rotation of the bearing. An upper ring 3O and a lower ring 3U can, for example, be seated at oppositely disposed sides of an intermediate ring 3Z and can, for example, be connected to one another by bolts. Joints 9 at which said rings are adjacent to one another are disposed between said upper, intermediate, and lower rings.

Alternatively or additionally to said joints that extend in planes perpendicular to the axis of rotation, said bearing ring 3 can also comprise further joints that can be disposed in planes containing the axis of rotation of the bearing, cf. FIG. 2. Such vertical joints 12 can result when one or more of said upper, intermediate, and lower rings are each set up of a plurality of ring segments 10, 11 that are set behind one another in the peripheral direction, cf. FIG. 2.

The other bearing ring 2 can also be composed of a plurality of ring parts or ring segments, for example a retaining ring 2U and a carrying ring 2O, with corresponding seals at the joints also being able to be provided at said other ball race 2, even though this is not shown in FIG. 1.

As FIG. 3 shows, the seals 11 for sealing said joints 9 can form elongate sectional bodies in the manner of an extruded section that can have a substantially unchanging cross-section along their longitudinal extent. Said seal 11 can in particular have an approximately U-shaped cross-section that is formed by two seal limbs 12 and 13 spaced apart from one another and one connection section 14 connecting the sealing limbs 12, 13. FIG. 3 shows that the connection section 14 can have a width B.

Said sealing limbs 12 and 13 can be shaped integrally in one piece with material homogeneity at the connection section 14, with said sealing limbs 12 and 13 being able to substantially project perpendicular from the connection section 14 in the manner of webs.

Laterally projecting, web-shaped sealing lips 15 can be attached, in particular integrally formed in one piece with material homogeneity, at said sealing limbs 12 and 13, cf. FIG. 3.

Said sealing limbs 12 and 13 are intended to be seated, in particular pressed, in sealing grooves 16 that are worked into the different ring parts or ring segments at both sides of a respective joint 9. Said sealing grooves 16 extend here along a respective joint 9 and are open toward the respective outer side of the ball race so that the seal 11 can be placed onto the respective outer side and the connection section 14 of the seal 11 extends beyond the joint 9. Said outer side of the respective ball race here does not necessarily mean its outer peripheral side since the respective joint 9 can also be sealed on an inner peripheral side of the respective ball race and/or on an axial front end depending on its extend and its configuration. The arrangement of the seal on the outer side to this extent means that the seal 11 is not arranged in the gap, that is in the region of the mutually adjacent segments in the region of the joint, which could, however, nevertheless also be the case.

As FIG. 3 shows, the seal 11 advantageously has a desired stretching section 17 in the region of the connection section 14, said desired stretching section 17 being able to have an increased elasticity and/or greater yield and/or greater stretchability and/or a smaller stretching resistance in comparison with adjacent sealing sections and/or in comparison with the sealing limbs 12 and 13.

As FIG. 3 shows, said desired stretching point or said desired stretching section 17 can have a reduced wall thickness that is reduced in comparison with the adjacent sealing sections.

Alternatively or additionally, said desired stretching section 17 can comprise a stretching fold 18 that is contoured in the form of a channel and/or is arched in a corrugated cardboard-like manner and that extends or is drawn flat on the drawing apart of the sealing limbs 12 and 13 and that compensates said drawing apart of the sealing limbs. A plurality of stretching folds 18 can also be arranged next to one another in this respect.

We claim:

1. A seal for a large roller bearing for sealing a joint between two adjacent ring segments or ring parts of the roller bearing, wherein the seal comprises:
    at least two mutually spaced apart sealing limbs comprising a rubber elastic and/or yielding sealing material for sealing insertion into sealing grooves formed at both sides of the joint in ring segments or ring parts adjacent to one another;
    a connection section connecting the at least two mutually spaced apart sealing limbs and comprising a rubber elastic and/or yielding sealing material that spans the joint; and a desired stretching section in a region of the connection section,
wherein the desired stretching section has a greater elasticity and/or a smaller stretching stiffness than adjacent sealing sections and/or the at least two mutually spaced apart sealing limbs,
wherein the desired stretching section has a stretching fold contoured in a channel shape or in a bead shape, and
wherein the stretching fold is configured to be drawn flat by drawing the at least two mutually spaced apart sealing limbs apart.

2. The seal of claim 1, wherein the at least two mutually spaced apart sealing limbs and the connection section form an elongate section member having a U-shaped cross-section, and wherein the connection section is interposed between the at least two mutually spaced apart sealing limbs.

3. The seal of claim 2, wherein the desired stretching section has a reduced wall thickness that is reduced in comparison with the wall thickness of adjacent seal sections and/or in comparison with the wall thickness of the at least two mutually spaced apart sealing limbs.

4. The seal of claim 1, wherein the at least two mutually spaced apart sealing limbs and the connection section are formed integrally as a single piece with material homogeneity and/or of the same elastic sealing material, and wherein the same elastic sealing material comprises a plastic material and/or rubber material.

5. The seal of claim 1, wherein the connection section is configured to permit and compensate deformations and relative movements of the two adjacent ring segments relative to one another so that the joint remains sealed on widening and/or relative movements with respect to one another.

6. The seal of claim 1, wherein the at least two mutually spaced apart sealing limbs have laterally projecting sealing lips that lie at the at least two mutually spaced apart sealing limbs and at groove walls adjacent thereto on an insertion of the at least two mutually spaced apart sealing limbs into the sealing grooves.

7. The seal of claim 1, wherein the at least two mutually spaced apart sealing limbs have a height less than 75% of the width B of the connection section.

8. The seal of claim 1, wherein the at least two mutually spaced apart sealing limbs have a height less than 50% of the width B of the connection section.

9. The seal of claim 1, wherein the desired stretching section has a reduced wall thickness that is reduced in comparison with the wall thickness of adjacent seal sections and/or in comparison with the wall thickness of the at least two mutually spaced apart sealing limbs.

10. A seal for a large roller bearing for sealing a joint between two adjacent ring segments or ring parts of the roller bearing, wherein the seal comprises:
at least two mutually spaced apart sealing limbs comprising a rubber elastic for sealing insertion into sealing grooves formed at both sides of the joint in ring segments or ring parts adjacent to one another;
a connection section connecting the at least two mutually spaced apart sealing limbs and comprising a rubber elastic that spans the joint; and
a desired stretching section in a region of the connection section, wherein the desired stretching section has greater elasticity and smaller stretching stiffness than both adjacent portions of the connection section and the at least two mutually spaced apart sealing limbs, and
the desired stretching section has a stretching fold contoured in a channel shape or in a bead shape, and
wherein the stretching fold is configured to be drawn flat by drawing the at least two mutually spaced apart sealing limbs apart.

11. The seal of claim 10, wherein the desired stretching section has a reduced wall thickness that is reduced in comparison with the wall thickness of adjacent seal sections and/or in comparison with the wall thickness of the at least two mutually spaced apart sealing limbs.

12. The seal of claim 10, wherein the desired stretching section has a reduced wall thickness that is reduced in comparison with the wall thickness of adjacent seal sections and/or in comparison with the wall thickness of the at least two mutually spaced apart sealing limbs.

13. A roller bearing in the form of an open centered large roller bearing, comprising:
two roller races rotatable with respect to one another, wherein at least one of the roller races comprises ring segments or ring parts adjacent to one another at a joint; and
a seal for sealing the joint, wherein the seal comprises:
at least two mutually spaced apart sealing limbs comprising a rubber elastic and/or yielding sealing material for sealing insertion into a respective sealing groove at both sides of the joint in ring segments or ring parts adjacent to one another, wherein the respective sealing groove at both sides of the joint is open toward the outer side; and
a connection section connecting the at least two mutually spaced apart sealing limbs and comprising a rubber elastic and/or yielding sealing material that spans the joint,
wherein the at least two mutually spaced apart sealing limbs of the seal are sealingly seated in the respective sealing groove at both sides of the joint and with the connection section of the seal spanning the joint.

14. The roller bearing of claim 13, wherein the joint extends in a plane containing the axis of rotation of the roller bearing, and wherein the seal is seated on a peripheral surface of one of the roller races.

15. The roller bearing of claim 14, wherein the at least two mutually spaced apart sealing limbs are configured to be inserted into the respective sealing groove at both sides of the joint while elastically deformed and be clampingly held in the respective sealing groove at both sides of the joint.

16. The roller bearing of claim 13, wherein the joint extends in a plane perpendicular to the axis of rotation of the roller bearing, and wherein the seal is seated on a peripheral surface of one of the roller races.

17. The roller bearing of claim 16, wherein the at least two mutually spaced apart sealing limbs are configured to be inserted into the respective sealing groove at both sides of the joint while elastically deformed and be clampingly held in the respective sealing groove at both sides of the joint.

18. The roller bearing of claim 13, wherein the at least two mutually spaced apart sealing limbs are configured to be inserted into the respective sealing groove at both sides of the joint while elastically deformed and be clampingly held in the respective sealing groove at both sides of the joint.

* * * * *